United States Patent
Lehtovirta et al.

(10) Patent No.: US 9,686,280 B2
(45) Date of Patent: Jun. 20, 2017

(54) USER CONSENT FOR GENERIC BOOTSTRAPPING ARCHITECTURE

(71) Applicant: Telefonaktiebolaget L M Ericsson (publ), Stockholm (SE)

(72) Inventors: Vesa Lehtovirta, Espoo (FI); Karl Norrman, Stockholm (SE); Oscar Ohlsson, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/901,752

(22) PCT Filed: Jun. 27, 2014

(86) PCT No.: PCT/SE2014/050809
§ 371 (c)(1),
(2) Date: Dec. 29, 2015

(87) PCT Pub. No.: WO2015/002596
PCT Pub. Date: Jan. 8, 2015

(65) Prior Publication Data
US 2016/0149914 A1 May 26, 2016

Related U.S. Application Data

(60) Provisional application No. 61/841,472, filed on Jul. 1, 2013.

(51) Int. Cl.
*H04L 9/32* (2006.01)
*H04L 29/06* (2006.01)
(Continued)

(52) U.S. Cl.
CPC ........ *H04L 63/0876* (2013.01); *G06F 9/4416* (2013.01); *H04L 9/0869* (2013.01);
(Continued)

(58) Field of Classification Search
CPC ..... H04L 63/08; H04L 63/10; H04L 63/0876; H04L 9/0869; H04L 9/3271;
(Continued)

(56) References Cited

U.S. PATENT DOCUMENTS 7,966,000 B2 * 6/2011 Semple ............... H04L 63/0853
455/411
8,230,213 B2 * 7/2012 Yang ................... H04L 63/0869
713/155

(Continued)

FOREIGN PATENT DOCUMENTS

| WO | 2009046400 A1 | 4/2009 |
| WO | 2012040198 A1 | 3/2012 |
| WO | 2013003535 A1 | 1/2013 |

OTHER PUBLICATIONS

3GPP, "3rd Generation Partnership Project; Technical Specification Group Services and System Aspects; Generic Authentication Architecture (GAA); Generic Bootstrapping Architecture (GBA) (Release 12)", 3GPP TS 33.220 V12.0.0, Mar. 2013, 1-92.

(Continued)

*Primary Examiner* — Hosuk Song
(74) *Attorney, Agent, or Firm* — Murphy, Bilak & Homiller, PLLC (57) ABSTRACT

It is disclosed a method and a bootstrapping client (33) for assuring that a particular user (31) is present at local user authentication. It is also disclosed a method and a network application function (36) for authenticating a generic authentication architecture, GAA, client (34) to network application function, NAF (36). In addition, the NAF (36), requiring that the presence of the authorized user should be confirmed, sends a Nonce denoted as Nonce_UI, in which UI stands for "User Involvement". The Nonce_UI indicates explicitly that the user involvement is required.

21 Claims, 5 Drawing Sheets

(51) Int. Cl.
*H04L 9/08* (2006.01)
*H04W 12/06* (2009.01)
*G06F 9/44* (2006.01)

(52) U.S. Cl.
CPC ............ *H04L 9/3271* (2013.01); *H04L 63/10* (2013.01); *H04W 12/06* (2013.01); *H04L 2209/80* (2013.01); *H04L 2463/082* (2013.01)

(58) Field of Classification Search
CPC ........... H04L 2209/80; H04L 2463/082; G06F 21/31; G06F 9/4401; G06F 9/4416; H04W 12/06
USPC .............................. 726/2–6; 713/2, 168, 185
See application file for complete search history.

(56) References Cited

U.S. PATENT DOCUMENTS

| | | | | |
|---|---|---|---|---|
| 8,275,355 | B2* | 9/2012 | Huang | ................ H04L 63/0869 380/247 |
| 8,522,334 | B2* | 8/2013 | Haynes | ................ H04W 12/06 726/9 |
| 8,543,814 | B2* | 9/2013 | Laitinen | ................ H04L 9/0838 713/155 |
| 8,978,100 | B2* | 3/2015 | Counterman | ........... H04L 9/321 726/27 |
| 2006/0218396 | A1 | 9/2006 | Laitinen et al. | |
| 2008/0301785 | A1 | 12/2008 | Beyer et al. | |
| 2011/0145575 | A1 | 6/2011 | Blommaert et al. | |
| 2011/0302627 | A1 | 12/2011 | Blom et al. | |
| 2013/0139235 | A1 | 5/2013 | Counterman et al. | |

OTHER PUBLICATIONS

3GPP, "3rd Generation Partnership Project; Technical Specification Group Services and System Aspects; Recommendations for trusted open platforms (Release 11)", 3GPP TR 33.905 V11.0.0, Sep. 2012, 1-15.

3GPP, "Technical Specification Group Services and System Aspects; Generic Authentication Architecture (GAA); Generic Bootstrapping Architecture (GBA) (Release 12)", 3GPP TS 33.220 V12.1.0, Jun. 2013, 1-92.

3GPP, "Technical Specification Group Services and System Aspects; Study on Security aspects of integration of Single Sign-On (SSO) frameworks with 3GPP operator-controlled resources and mechanisms; (Release 12)", 3GPP TR 33.895 V0.7.0, Oct. 2013, 1-25.

Unknown, Author, "SSO TR 33.895: GBA_U-based solution with user consent", Gemalto, Ericsson, Morpho Cards, 3GPP TSG SA WG3 (Security) Meeting #73, S3-1301082, San Francisco, Nov. 11-15, 2013, 1-9.

Unknown, Author, "Using user consent for GBA and SSO", Ericsson, ST-Ericsson, 3GPP TSG SA WG3 (Security) Meeting #72, S3-130891, Qingdao, P.R. China, Jul. 8-12, 2013, 1-4.

* cited by examiner

USER CONSENT FOR GENERIC BOOTSTRAPPING ARCHITECTURE

TECHNICAL FIELD

This disclosure relates to assuring that a particular user is present at local authentication. In more particular, it relates to bootstrapping client, a method and a computer program for assuring that a particular user is present at local authentication. It also relates to a network application function (NAF), a method and a computer program for authenticating a GAA client to a NAF.

BACKGROUND

The generic bootstrapping architecture (GBA) as specified e.g. in the third generation partnership project (3GPP) TS 33.220, version 12.0.0, is used for authenticating subscribers to a bootstrapping server in a network based on their subscription credentials, i.e. in the (universal) subscriber identity module ((U)SIM). The authentication results in a mutual authentication between the network and a mobile device/UE/terminal, and in that keys or credentials, are established between an application function and the mobile device.

Figure 1:
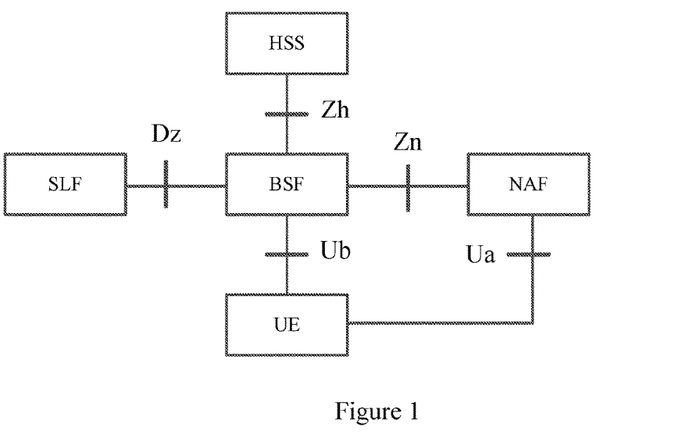
FIG. 1 illustrates schematically a GBA network.

FIG. 1 illustrates an exemplary GBA/GAA, with a NAF 1 connected to a BSF 3. A BSF and a user entity (UE) 2 mutually authenticates using the authentication and key agreement (AKA) protocol, and UE communicates with BSF over an interface Ub. The UE and a home subscriber system (HSS) shares a key that is a basis for HSS to generate an authentication vector provided to BSF over interface Zh. According to the AKA protocol, BSF sends to UE a challenge, and UE returns a response to BSF. The authentication is verified by BSF comparing the UE response with an expected response as provided by HSS. A successful authentication initiates at BSF and UE a generation of a shared key Ks. BSF stores the key Ks and associated reference bootstrapping transaction identifier (B-TID). The reference B-TID and other data, such as a key lifetime, are thereafter provided to UE in a completion message. A subscriber locator function (SLF) is queried by the BSF over interface Dz in conjunction with the Zh interface operation to get the name of the home subscriber server (HSS) containing the required subscriber-specific data. UE may connect simultaneously to at least one application server through a network application function (NAF) authentication proxy. The connection comprises a first step of authentication between UE and NAF. Thereby, UE provides the reference B-TID to NAF, which, using B-TID, requests a key, or credential, Ks_NAF, from BSF over interface Zn. The key Ks_NAF is derived from the key Ks. The same key or credential may be derived at UE. Authentication is thereafter performed, based on the derived key Ks_NAF. The communication between UE and NAF is over an interface Ua.

Figure 2:
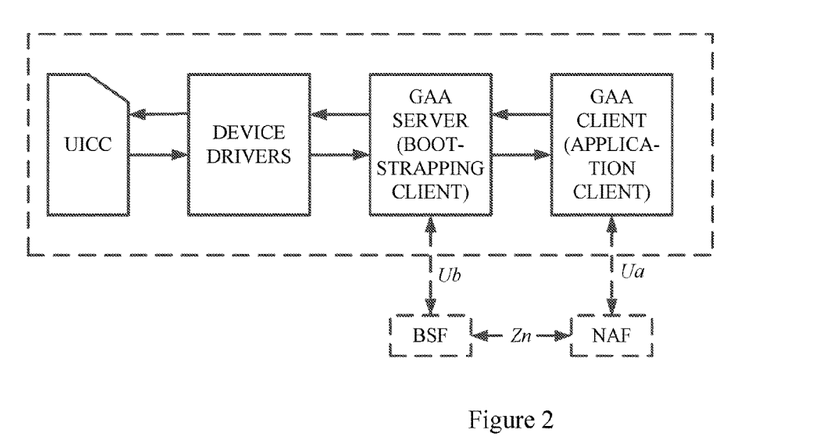
FIG. 2 schematically illustrates a terminal implementing GBA.

FIG. 2 illustrates GAA-related functionalities in a terminal, e.g. in the UE in FIG. 1 according to Trusted open platform specified e.g. in the TR 33.905, V11.0.0. The realization of the GBA in a terminal can be divided into a GAA server and GAA client, wherein the GAA server in the terminal is the counterpart of the BSF. The GAA server may also be referred to as a bootstrapping client, as indicated in FIG. 2, and the GAA client in the terminal is the counterpart of the NAF, and may also be referred to as an Application client; see FIG. 2.

Typically, the internal interfaces and the application programming interfaces (APIs) of the terminal are not standardized. Further, the bootstrapping client (GAA server) is a trusted element, which is trusted to perform bootstrapping and deriving NAF keys for all applications according to existing GBA functionality. The GAA server will hereinafter be referred to as a bootstrapping client. As illustrated in FIG. 2, the bootstrapping client communicates with the BSF over a Ub interface, and with a universal integrated circuit card (UICC) e.g. through relevant device drivers. The GAA client communicates over the network with the NAF and with the bootstrapping client in order to obtain the NAF-specific GAA credentials. When a NAF requests a GAA client to authenticate itself with GAA credentials, the GAA client communicates with the bootstrapping client for GAA credentials specific to that NAF.

However, in the case the terminal is a smartphone, and a parent for instance makes purchases with the smartphone from a web-shop that uses GBA for authentication, a child may accidentally make additional purchases from the web-shop, if the phone is available to the child, since the authentication has already succeeded, and the connection to the web-shop may still be alive. Thus, there is a need to improve the security.

SUMMARY

It is an object of embodiments of the invention to address at least some of the issues outlined above, and this object and others are achieved by a bootstrapping client, and a network application function (NAF) and accompanying methods, according to the appended independent claims, and by the embodiments according to the dependent claims.

According to a first aspect, this disclosure provides a method in a bootstrapping client of a terminal for assuring that a particular user is present at local user authentication, enabling authentication of a generic authentication architecture (GAA) client to a NAF. The method comprises receiving from the GAA client a request for a NAF specific credential, wherein the request comprises a Nonce. The method also comprises requesting user authentication information, and receiving user authentication information. The method further comprises deriving the NAF specific credential based on the Nonce, when the received user authentication information is correct. In addition, the method comprises sending to the GAA client a response comprising said NAF specific credential, so that the GAA client can calculate an authentication response using the NAF specific credential, when local user authentication is given, and send the authentication response to the NAF.

According to a second aspect, this disclosure provides a bootstrapping client of a terminal adapted to assure that a particular user is present at local user authentication, enabling authentication of a GAA client to a NAF. The bootstrapping client is further adapted to receive from the GAA client, a request for a NAF specific credential, the request comprising a Nonce. The bootstrapping client is further adapted to request user authentication information and to receive user authentication information. The bootstrapping client is also adapted to derive the NAF specific credential based on the Nonce, when the received user authentication information is correct, and to send to the GAA client, a response comprising said NAF specific credential, so that the GAR client can calculate an authentication response using the NAF specific credential, when local user authentication is given, and send said authentication response to the NAF.

According to a third aspect, this disclosure provides a bootstrapping client of a terminal adapted to assure that a particular user is present at local user authentication, enabling authentication of a GAA client to a NAF. The bootstrapping client comprises a receiver/transmitter, a processor, and a memory storing a computer program comprising computer program code. When this computer program is run in the processor, it causes the bootstrapping client to receive from the GAA client, via the receiver/transmitter, a request for a NAF specific credential, the request comprising a Nonce. When this computer program is run in the processor, it also causes the bootstrapping client to request user authentication information; and to receive user authentication information. In addition, when this computer program is run in the processor, it causes the bootstrapping client to derive the NAF specific credential based on the Nonce, when the received user authentication information is correct, and to send to the GAA client, via the receiver/transmitter, a response comprising said NAF specific credential, so that the GAA client can calculate an authentication response using the NAF specific credential, when local user authentication is given, and send said authentication response to the NAF.

According to a fourth aspect, this disclosure provides a computer program comprising computer readable code which when run on a processor of a bootstrapping client performs, for assuring that a particular user is present at local user authentication, enabling authentication of a GAA client to a NAF, receiving from the GAA client a request for a NAF specific credential, wherein the request comprises a Nonce. The computer program when run on the processor also performs requesting user authentication information, and receiving user authentication information. The computer program when run on the processor further performs deriving the NAF specific credential based on the Nonce, when the received user authentication information is correct. In addition, the computer program when run on the processor also performs sending to the GAA client a response comprising said NAF specific credential, so that the GAA client can calculate an authentication response using the NAF specific credential, when local user authentication is given, and send the authentication response to the NAF.

According to a fifth aspect, this disclosure provides a method in a NAF for authenticating a GAA client to the NAF. The method comprises sending to the GAA client an authentication challenge comprising a Nonce, such that the GAA client can send to a bootstrapping client a request for a NAF specific credential, the request comprising the Nonce. The method also comprises receiving from the GAA client a Ua application request comprising an authentication response to the authentication challenge, the authentication response being based on the NAF specific credential as derived by the bootstrapping client based on the Nonce, when the bootstrapping client is assured during a local user authentication that a particular user is present. The method also comprises sending to a BSF a request for the NAF specific credential. The method further comprises receiving from the BSF the NAF specific credential, which is calculated based on the Nonce. In addition, the method comprises verifying the authentication response as received from the GAA client, based on the received NAF specific credential.

According to a sixth aspect, this disclosure provides a NAF node adapted to authenticate a GAA client to the NAF. The NAF node is further adapted to send to the GAA client an authentication challenge comprising a Nonce, such that the GAA client can send to a bootstrapping client a request for a NAF specific credential, the request comprising the Nonce. The NAF node is also adapted to receive from the GAA client a Ua application request comprising an authentication response to the authentication challenge, the authentication response being based on the NAF specific credential as derived by the bootstrapping client based on the Nonce, when the bootstrapping client is assured during a local user authentication that a particular user is present. The NAF node is also adapted to send to a BSF a request for the NAF specific credential, and to receive from the BSF the NAF specific credential, which is calculated based on the Nonce. In addition, the NAF node is also adapted to verify the authentication response as received from the GAA client, based on the received NAF specific credential.

According to a seventh aspect, this disclosure provides a NAF node adapted to authenticate a GAA client to the NAF. The NAF node comprises a receiver, a transmitter, a processor, and a memory storing a computer program comprising computer program code. When this computer program is run in the processor, it causes the NAF to send to the GAA client via the transmitter an authentication challenge comprising a Nonce, such that the GAA client can send to a bootstrapping client a request for a NAF specific credential, the request comprising the Nonce. When this computer program is run in the processor, it further causes the NAF to receive from the GAA client, via the receiver, a Ua application request comprising an authentication response to the authentication challenge, the authentication response being based on the NAF specific credential as derived by the bootstrapping client based on the Nonce, when the bootstrapping client is assured during a local user authentication that a particular user is present. When this computer program is run in the processor, it further causes the NAF to send to a BSF, via the transmitter, a request for a NAF specific credential, and to receive from the BSF, via the receiver, the NAF specific credential, which is calculated based on the Nonce. In addition, when this computer program is run in the processor, it also causes the NAF to verify the authentication response as received from the GAA client, based on the received NAF specific credential.

According to an eighth aspect, this disclosure provides a computer program comprising computer readable code which when run on a processor of a network application function performs, for authenticating a GAA client to the NAF, sending to the GAA client via the transmitter an authentication challenge comprising a Nonce, such that the GAA client can send to a bootstrapping client a request for a NAF specific credential, the request comprising the Nonce. When this computer program is run in the processor, it further performs receiving from the GAA client, via the receiver, a Ua application request comprising an authentication response to the authentication challenge, the authentication response being based on the NAF specific credential as derived by the bootstrapping client based on the Nonce, when the bootstrapping client is assured during a local user authentication that a particular user is present. When this computer program is run in the processor, it further performs sending to a BSF, via the transmitter, a request for a NAF specific credential, and receiving from the BSF, via the receiver, the NAF specific credential, which is calculated based on the Nonce. In addition, when this computer program is run in the processor, it also performs verifying the authentication response as received from the GAA client, based on the received NAF specific credential.

Advantages with the embodiments of the disclosure involve enabling confirmation that correct user is present and gives consent for using GBA keys or credentials for an application. Using a nonce approach ensures that the NAF specific credential is always fresh and not cached in the GAA client, and that the NAF specific credential is bound to the Ua application transaction and cannot be used outside of that context.

The embodiments further provide practically two-factor authentication, and avoid the burden and complexity of synchronizing the user authentication credentials, e.g. username and password or PIN code, with the network.

BRIEF DESCRIPTION OF THE DRAWINGS

Embodiments will now be described in more detail, and with reference to the accompanying drawings, in which.

DETAILED DESCRIPTION

In the following description, different embodiments of the invention will be described in more detail, with reference to accompanying drawings. For the purpose of explanation and not limitation, specific details are set forth, such as particular examples and techniques in order to provide a thorough understanding.

Currently, it is not possible to efficiently authenticate a specific human user to the NAF in a GBA-based system. The GBA as currently specified only provides authentication of the subscription, i.e., of the (U)SIM application on the UICC, and the user may be prompted for a personal identification number (PIN) code to access the (U)SIM card. This provides some assurance that the intended person was present at the time the PIN was entered into the mobile device. However, this typically only happens when the phone being used is powered on. Further, in the case of GBA-mobile equipment (ME), the (U)SIM is only used by GBA during the bootstrapping phase, so it is only possible to get assurance of the presence of the person during a GBA bootstrapping.

If a NAF and a UE share keys established via GBA, and the NAF wishes to further ensure that the correct person is behind a keyboard or a phone, this cannot be achieved. It does not even help to trigger a new bootstrapping since there is no requirement that the user shall enter the PIN code for (U)SIM access when that happens. In case of GBA-U the NAF keys are derived in the (U)SIM (or ISIM) application and some parts of the Ua application may be run in the (U)SIM application, but there is no requirement that the user shall enter the PIN code for (U)SIM access.

Embodiments of the present disclosure involve a local user authentication performed by a bootstrapping client/GAA server in a GBA terminal, when a GAA client indicates that local user authentication is needed. In the local user authentication, a user may authorize the bootstrapping client to derive NAF keys for a specific GAA client. The NAF keys will hereinafter be referred to as NAF specific credentials, which is considered to be a more precise definition of what is being derived herein.

A procedure according to an embodiment comprises the GAA client in the terminal contacting the NAF in order to access a service. According to an embodiment, the NAF then indicates to the GAA client to use GBA-based specific credentials to secure the Ua application protocol, and in addition the NAF also requires that the presence of the authorized user needs to be confirmed by sending a Nonce denoted Nonce_UI, in which UI stands for "User Involvement", which explicitly indicates that user involvement is required.

When the GAA client requests NAF specific credentials from the bootstrapping client, the GAA client also requests local user authentication to be performed by the bootstrapping client, by sending Nonce_UI.

If and only if the bootstrapping client has received assurance during the local user authentication that a particular user is present, e.g. by the user entering user authentication information, such as a PIN code, and the bootstrapping client is informed whether the user authentication information is correct, or the bootstrapping client performing the verification itself, the bootstrapping client derives a new type of NAF specific credentials which are bound to the ongoing transaction by including the Nonce_UI in the NAF specific credential derivation. The Nonce_UI may be, e.g., a (pseudo) randomly generated bit string, a (pseudo) randomly generated number, a counter or a timestamp. It may also be derived from other parameters. For example, setting the Nonce_UI equal to a cryptographic hash of the current time is one possibility to generate a pseudo random bit string.

The User Involvement, UI, on the Nonce_UI indicates that a user will have to be involved when the bootstrapping client receives user authentication information, for example a PIN code.

When the bootstrapping client receives user authentication information that is correct, i.e. the received user authentication information corresponds to a predefined user authentication information, the bootstrapping client confirms that the assured that a particular person is present, since the user authentication information is user specific.

By deriving the NAF specific credential based on the Nonce_UI, which is newly created for each user application request, the bootstrapping client is assured that the user authentication has been received recently and based on receipt of the correct user authentication, it is assured that the user was present entering the user authentication information.

It should be noted that the result of the local user authentication does not have to be taken into the NAF specific credential derivation. Instead, the bootstrapping client is a trusted element in the terminal which, in addition to performing bootstrapping and deriving NAF specific credentials for all applications according to existing GBA functionality, is trusted to perform local user authentication when the GAA client indicates that local user authentication is needed.

Another possibility is that the user authentication information, for example a PIN, or a derivation thereof, is input to the NAF specific credential derivation. If that is the case, the user authentication information needs to be known also in the network, so that the network can perform the corresponding specific credential derivation. If the GAA client does not indicate that local user authentication is needed, e.g. because the GAA client does not support forwarding the Nonce_UI or maliciously leaves it off with the intention to avoid that user consent is asked for, the bootstrapping client derives the regular NAF specific credentials according to existing GBA functionality.

The GAA client uses the received NAF specific credentials or derivatives thereof in the Ua application protocol, to achieve for example authentication, encryption or integrity protection. The NAF requests the NAF specific credentials from the BSF and includes the Nonce_UI in the Zn request and gets the same NAF specific credentials as the GAA client did.

The local user authentication according to the embodiments is for example a PIN code or a screen wipe pattern which the user has defined for the bootstrapping client, or a fingerprint or something else, but it should not be just yes/no answer. However, many different types of local authentication may be used.

It should be noted that, in case the user authentication information is a PIN code, it may not be the same as the PIN code to activate the USIM application. The relevant matter is that by local user authentication, the bootstrapping client can locally confirm that the authorized user is present. For instance, the bootstrapping client may present a dialog box to the user asking to authorize that application "Bank.com" can use GBA authentication.

It is noted that local user authentication denotes that the user is locally authenticated, typically in the bootstrapping client. When a user enters user authentication information, such as a PIN code, the bootstrapping client can authenticate the user due to that the fact that PIN codes are, as such, user specific.

In the following paragraph the term PIN code indicates the credential used by the user to authenticate to the bootstrapping client, it could for example be a password, PIN code, or an input generated from a hard token. The PIN code may be specific for the particular service used. For example, the same user may have different PIN codes for different services. There may also be different PIN codes for different users. For example, each family member may have their own PIN code even though they share the same device.

Figure 3:
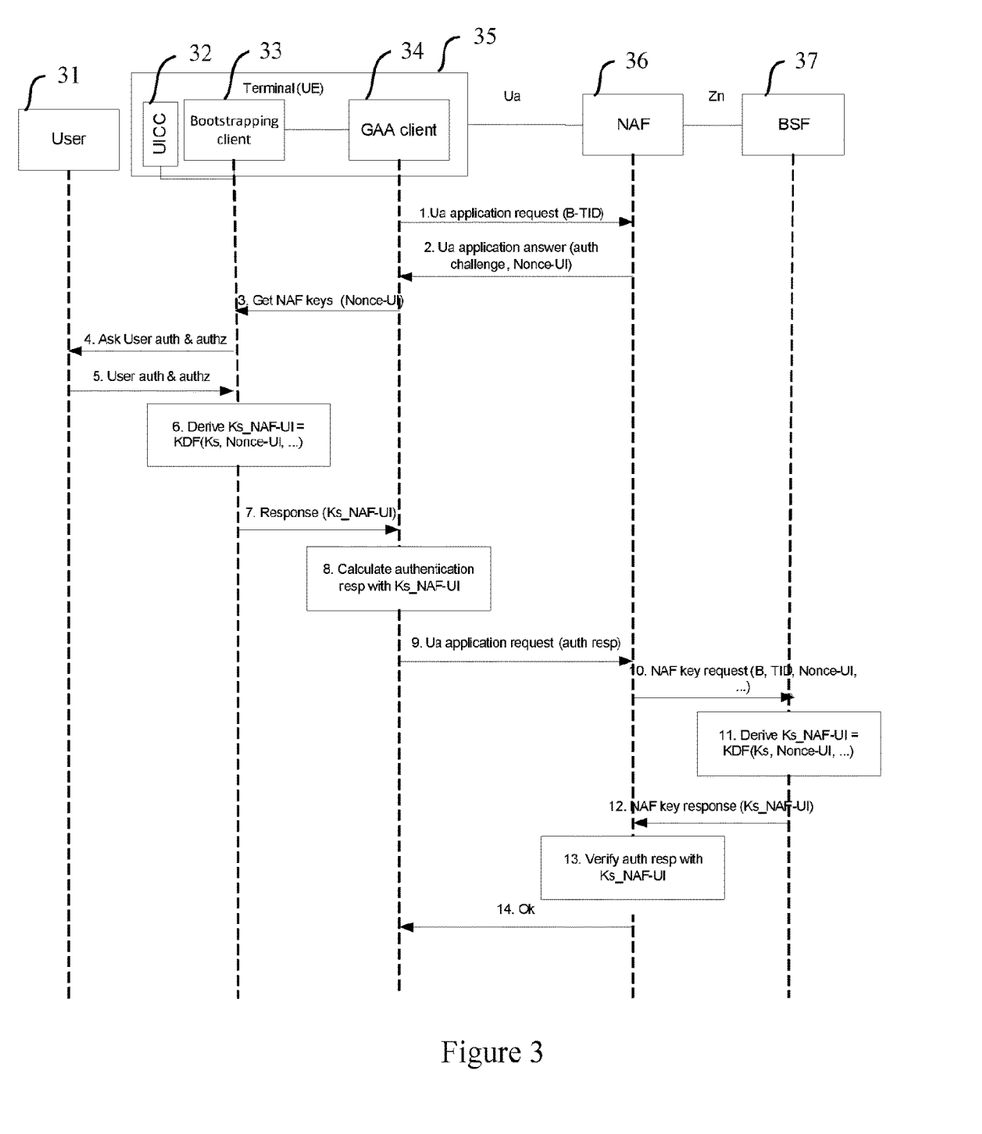
FIG. 3 presents a hand-shake diagram showing example steps, according to embodiments of this disclosure.

FIG. 3 is a hand-shake diagram illustrating an embodiment of the invention. Signalling is herein executed between a user 31; a terminal 35, comprising a UICC 32, a bootstrapping client 33 and a GAA client 34; a NAF node 36 and a BSF 37.

In signal 1, an application in the terminal 35, i.e. the GAA client 34 wants to access a service and sends an Ua application request to the application server, i.e. to the NAF node 36. The request includes a bootstrapping transaction identifier (B-TID). In signal 2, the NAF node sends an Ua application answer in return, with an authentication challenge and a Nonce requiring user involvement, i.e. a Nonce_UI, and when the GAA client requests NAF specific credentials from the bootstrapping client in the terminal, in signal 3, it includes the Nonce_UI in the request.

When the bootstrapping client in the terminal receives the request for NAF specific credentials with Nonce_UI, the bootstrapping client requests a user authentication and/or user authorization, i.e. requests a user to enter user authentication information, e.g. a PIN code to derive the NAF specific credentials for this GAA client, in signal 4. In signal 5, the user provides authentication and/or authorization, by the user authentication information, e.g. in the PIN code to the bootstrapping client.

Only if a user authorization is given, e.g. the user provided user authentication information, such as the PIN code, is correct, the bootstrapping client in the terminal derives NAF specific credentials using Nonce_UI as an input in the following way, wherein the NAF specific credential Ks_NAF-UI=KDF(Ks, Nonce_UI, . . . ), in step 6, wherein KDF is a key derivation function. The NAF specific credential Ks_NAF_UI is thus calculated using a key derivation function based on Ks, and Nonce_UI. It may also be derived from other parameters. The Ks can be a key that is shared between the BSF and the bootstrapping client during a prior bootstrapping. If needed, the bootstrapping client may run bootstrapping before step 6. Next, in signal 7, the bootstrapping client provides the NAF specific credential Ks_NAF-UI to the GAA client. In step 8, the GAA client uses the Ks_NAF-UI as the key to calculate an authentication response for the Ua application request, the authentication response being a response to the authentication challenge from signal 2. In signal 9, the GAA client in the terminal sends an Ua application request to the application server, i.e. to the NAF node, and the request includes the authentication response. The NAF requests NAF specific credentials, by including the Nonce_UI in the request, and optionally user security settings (USS), from the BSF over Zn, in signal 10. When the BSF receives the Zn request with Nonce_UI, the BSF calculates the NAF specific credential Ks_NAF-UI using Nonce_UI as an input in the derivation of the NAF specific credential, in step 11, which is similar to step 6. In signal 12, the BSF sends Zn response with the NAF specific credential Ks_NAF-UI to the NAF, and in step 13 the NAF uses the received NAF specific credential Ks_NAF-UI to verify the authentication response received from the GAA client in step 9. The NAF node sends in signal 14 an OK as an Ua response to the GAA as a result of a successful authentication.

The signalling diagram shows a generic authentication handshake between the GAA client and the NAF node over Ua to illustrate a mechanism according to embodiments, and it should be noted that the derived NAF specific credentials could be used to protect in principle any Ua application protocol.

According to alternative embodiments of the invention, the order of the steps in FIG. 3 may be different, and for example steps 10-12 could be performed between steps 1 and 2.

According to another embodiment, the Nonce_UI may also be generated by BSF, and it could be given to the NAF during Zn procedures, i.e. in steps 10-12. The NAF node may also request the BSF to derive the Nonce_UI. For example, there could be a parameter in the Zn request which indicates to BSF if the BSF is supposed to generate the Nonce_UI or if the NAF generates it. The presence of Nonce_UI in the Zn request could be an indication that NAF has generated it.

Whenever the term PIN code as an example of an user authentication information, is used herein, it should be understood that it could equally well be a password, a key, a token, a one time password received via short message service (SMS) or via some other communication channel, e.g., via a standalone computer or an application running on the device, or a parameter generated from a hard token.

The key derivation function (KDF) may be the one currently used in the GBA, as specified in the above-mentioned TS 33.220, or another suitable KDF. The input to the KDF could be the one used today for GBA amended with Nonce_UI, for example, in which NAF specific credential Ks_NAF is computed as Ks_NAF=KDF (Ks, "gba-me", random number (RAND), Internet protocol (IP) multimedia private identity (IMPI), NAF_Id, Nonce_UI), where KDF is the key derivation function as specified in Annex B of said TS, and the key derivation parameters consist of the user's IMPI, the NAF_Id and RAND. The NAF_Id is constructed as follows: NAF_Id=fully qualified domain name (FQDN) of the NAF||Ua security protocol identifier, wherein the Ua security protocol identifier is specified in Annex H of said TS. KDF shall be implemented in the mobile equipment (ME).

According to other embodiments, other parameters could be included in the KDF such a string "UserConsent", etc. Input to the KDF could be run through another KDF before putting into the KDF. Other parameters than those explicitly mentioned may be input to the key derivation processes in all instances described herein. The parameters may be put in a different order than explicitly mentioned. The parameters may be transformed before being input to the KDF. For example, a set of parameters P1, P2, . . . , Pn, for some non-negative integer n, could be transformed by first being run through function f and the result of that, i.e., f(P1, P2, . . . , Pn), being input to the KDF. Here is an example of the key derivation when the parameter P1 is first transformed before being input to the KDF to calculate a key called "output_key": output_key=KDF(f(P1), some other parameter), where f is some arbitrary function or chain of functions. The input "some other parameter" could be 0, 1 or more other parameters, e.g., used to bind the key to a certain context. Parameters may be input as separate parameters or may be concatenated together and then input in one single input to the KDF.

According to other embodiments, the bootstrapping client or the GAA client is not implemented in a phone being used, but one or both of them may also be implemented in the UICC, e.g. as is the case today for GBA_U and UICC-based applications. The bootstrapping client or the GAA client does not need to be in the same terminal but they could be in different terminals or other type of devices, like set top boxes.

Nonce_UI could be carried in different fields of the protocols used over Ua, e.g. in the product token field of hypertext transfer protocol (HTTP). The Nonce_UI could also be the same Nonce that is used in an Ua authentication protocol, e.g. it could be the Nonce of HTTP digest.

In one embodiment, the PIN code or PIN codes are used for Ks_NAF-UI calculation in the bootstrapping client and BSF. The BSF is aware of the PIN code or PIN codes used. The BSF may get the PIN code or PIN codes from the bootstrapping client during bootstrapping phase or by other means. The BSF can take the PIN code to the NAF specific credential Ks_NAF-UI calculation and provide the NAF with the Ks_NAF-UI. The bootstrapping client may take the PIN code received from the user into Ks_NAF-UI calculation.

In another embodiment, the NAF is aware of the PIN code used. This may be useful when the PIN code is service specific and it may be inconvenient for the BSF to keep track of all the service specific PIN codes. When the NAF knows the PIN code, the BSF can provide the NAF with the Ks_NAF directly and the NAF will derive the Ks_NAF-UI. This is a trade-off between simplifying the system and the security level.

In yet another embodiment, the sending of Nonce_UI from the NAF to the GAA client is combined with a sending "Boostrapping negotiation request", as defined in the above-mentioned 3GPP TS 33.220. In this embodiment it may be an application on the UICC, e.g. the (U)SIM application, that would both ask the user consent and run a new bootstrapping with the BSF. This would enhance security in some cases when the UICC may be the only trusted element in the terminal.

Figure 4:
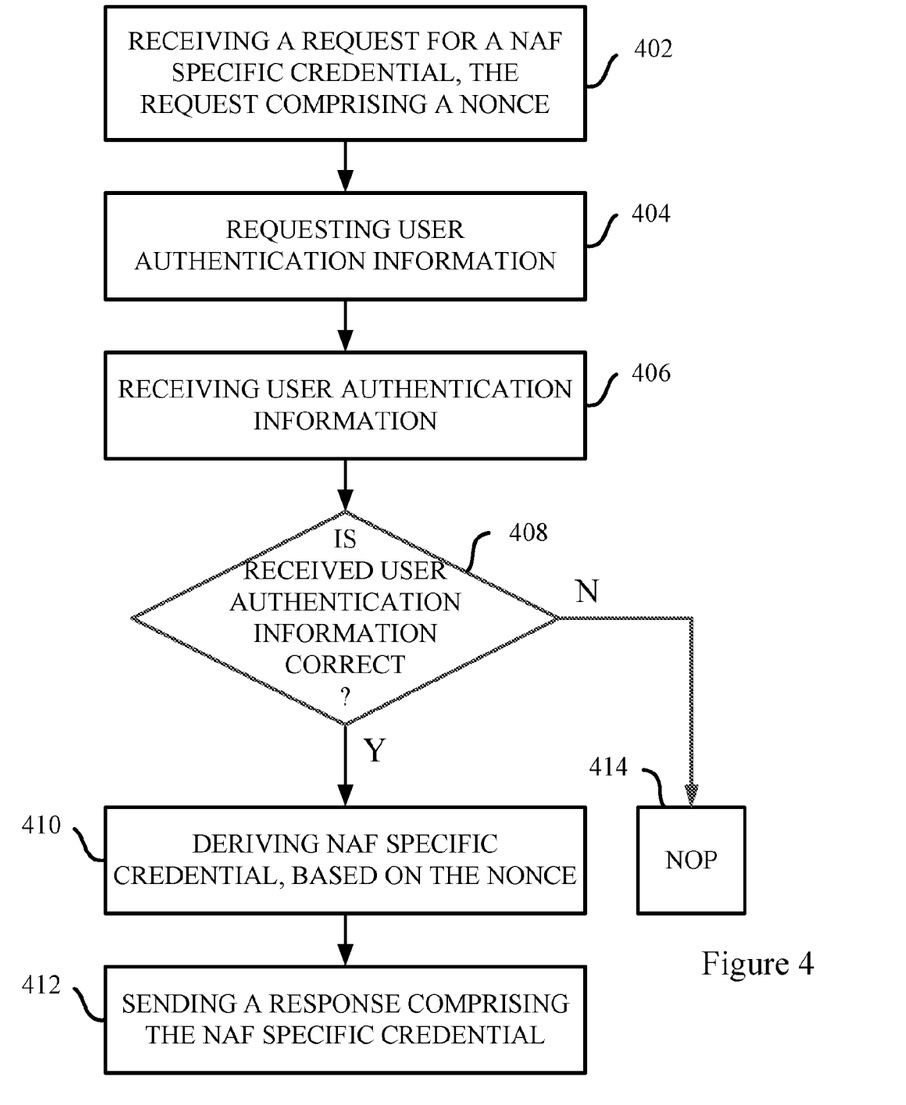
FIGS. 4 and 5 present a flow-chart of methods according to embodiments of this disclosure.

FIG. 4 illustrates a flow-chart of a method in a bootstrapping client 33 in a terminal 35, for assuring that a particular user is present at local user authentication, enabling authentication of a GAA client to a NAF 36.

In 402, the method comprises receiving from the GAA client a request for a NAF specific credential, wherein the request comprises a Nonce.

In 404, the method comprises requesting user authentication information.

In 406, the method comprises receiving user authentication information.

In 408, the method determines whether the received user authentication information is correct or not.

In 410, the method comprises deriving the NAF specific credential based on the Nonce, when the received user authentication information is correct.

In 412, the method comprises sending to the GAA client a response comprising said NAF specific credential, so that the GAA client can calculate an authentication response using the NAF specific credential, when local user authentication is given, and send said authentication response to the NAF.

In 414, the method may comprise no operation (NOP), when the received user authentication information is not correct.

Receiving 406 user authentication information may comprise receiving a personal identification number, PIN code, comprising any of: a password, a token, a one-time password received via short message service, SMS, or a parameter generated from a hard token, as indicated above.

Receiving 406 user authentication information may comprise receiving a screen swipe pattern defined by the user or a fingerprint.

Figure 5:
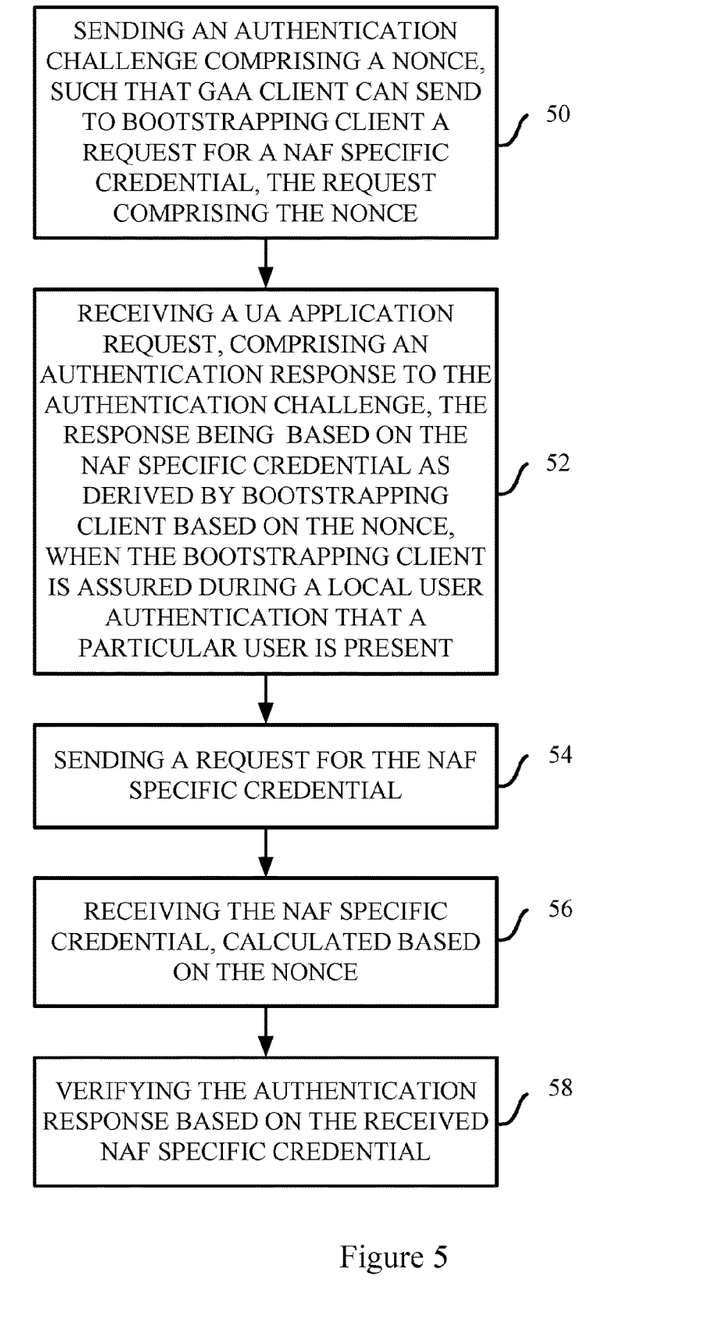

FIG. 5 illustrates a flow-chart of a method in a NAF 36 for authenticating GAA client 34 to the NAF.

In 50, the method comprises sending 2 to the GAA client an authentication challenge comprising a Nonce, such that the GAA client can send to a bootstrapping client a request for a NAF specific credential, the request comprising the Nonce.

In 52, the method comprises receiving 9 from the GAA client a Ua application request comprising an authentication response to the authentication challenge, where the authentication response being based on the NAF specific credential as derived by the bootstrapping client based on the Nonce, when the bootstrapping client is assured during a local user authentication that a particular user is present.

In 54, the method comprises sending 10 to a BSF a request for the NAF specific credential.

In 56, the method comprises receiving 12 from the BSF a NAF specific credential, which is calculated based on the Nonce.

In 58, the method comprises verifying 13 the authentication response as received from the GAA client, based on the received NAF specific credential.

Sending 10 the request for the NAF specific credential, may comprise sending the Nonce.

Receiving 12 the NAF specific credential may comprise receiving the NAF specific credential calculated using on a key derivation function.

Receiving 12 the NAF specific credential may comprise receiving the NAF specific credential calculated based on user authentication information.

Receiving 12 the NAF specific credential response may comprise receiving a NAF specific credential calculated based on user authentication information comprising a personal identification number, PIN code, a screen swipe pattern or a fingerprint.

Receiving 12 the NAF specific credential response may also comprise receiving a NAF specific credential calculated based on user authentication information comprising a PIN code that comprises any of: a password, a token, a one-time password received via short message service, SMS, or a parameter generated from a hard token.

Figure 6:
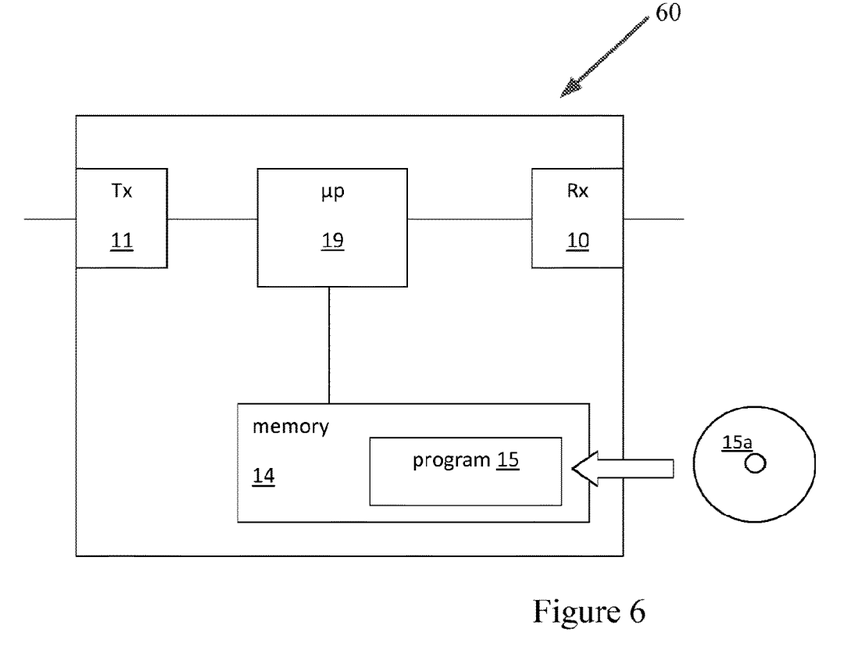
FIG. 6 illustrates schematically an exemplary network application function (NAF) node.

FIG. 6 illustrates schematically a NAF node 60 according to exemplary embodiments. The NAF node 60 is adapted to authenticate a GAA client 34 to the NAF. The NAF node comprises a receiver 10, a transmitter 11, a processor 19, and a memory 14 storing a computer program comprising computer program code. When this computer program is run in the processor, it causes the NAF to send 2 to the GAA client an authentication challenge comprising a Nonce, such that the GAA client can send 2, 50 to a bootstrapping client, via the transmitter 11, a request for a NAF specific credential, the request comprising the Nonce. When the computer program is run in the processor, it also causes the NAF to receive 9, 52 from the GAA client, via the receiver 10, a Ua application request, comprising an authentication response to the authentication challenge, wherein the authentication response being based on the NAF specific credential as derived by the bootstrapping client based on the Nonce, when the bootstrapping client is assured during a local user authentication that a particular user is present. When this computer program is run in the processor, it further causes the NAF to send 10, 54 to the BSF, via the transmitter 11, a request for the NAF specific credential, and to receive 12, 56 from the BSF, via the receiver 10, the NAF specific credential, which is calculated based on the Nonce. In addition, when this computer program is run in the processor, it also causes the NAF to verify 13, 58 the authentication response as received from the GAA client, based on the received NAF specific credential.

The computer program may be obtained from a remote source 15a, such as a data carrier.

The request for the NAF specific credential may comprise the Nonce.

The NAF specific credential may comprise the NAF specific credential calculated using on a specific credential derivation function based on the Nonce.

The NAF specific credential may comprise the NAF specific credential calculated based on user authentication information.

The NAF specific credential may comprise the NAF specific credential calculated based on user authentication information comprising a personal identification, PIN, code, a screen swipe pattern or a fingerprint.

The NAF specific credential may comprise the NAF specific credential calculated based on user authentication information comprising a PIN code comprising any of: a password, a token, a one-time password received via short message service, SMS, or a parameter generated from a hard token.

In addition, this disclosure also provides a NAF 36, 60 that is adapted to authenticate a GAA client to the NAF. The NAF is further adapted to send to the GAA client an authentication challenge comprising a Nonce, such that the GAA client can send to a bootstrapping client a request for a NAF specific credential, the request comprising the Nonce. The NAF is also adapted to receive from the GAA client a Ua application request comprising an authentication response to the authentication challenge, the authentication response being based on the NAF specific credential as derived by the bootstrapping client based on the Nonce, when the bootstrapping client is assured during a local user authentication that a particular user is present. The NAF is also adapted to send to a BSF a request for the NAF specific credential, and to receive from the BSF the NAF specific credential, which is calculated based on the Nonce. In addition, the NAF is also adapted to verify the authentication response as received from the GAA client, based on the received NAF specific credential.

This disclosure also provides a computer program 15 that comprises computer readable code which when run on a processor 19 of the NAF node 36, 60 causes the NAF to send 2 to the GAA client an authentication challenge comprising a Nonce, such that the GAA client can send to a bootstrapping client a request for a NAF specific credential, the request comprising the Nonce. When the computer program is run on a processor of the NAF node it causes the NAF to receive 9 from the GAA client a Ua application request comprising an authentication response to the authentication challenge, wherein the authentication response being based on the NAF specific credential as derived by the bootstrapping client based on the Nonce, when the bootstrapping client is assured during a local user authentication that a particular user is present. When the computer program is run on a processor of the NAF node it causes the NAF to send 10 to the BSF a request for the NAF specific credential, and to receive 12 from the BSF the NAF specific credential, which is calculated based on the Nonce. In addition, when the computer program is run on a processor of the NAF node it also causes the NAF to verify 13 the authentication response as received from the GAA client, based on the received NAF specific credential.

This disclosure also provides a computer program product that comprises a computer program readable medium 15a and a computer program 15, as above, wherein the computer program is stored on a computer readable medium 15a.

Figure 7:
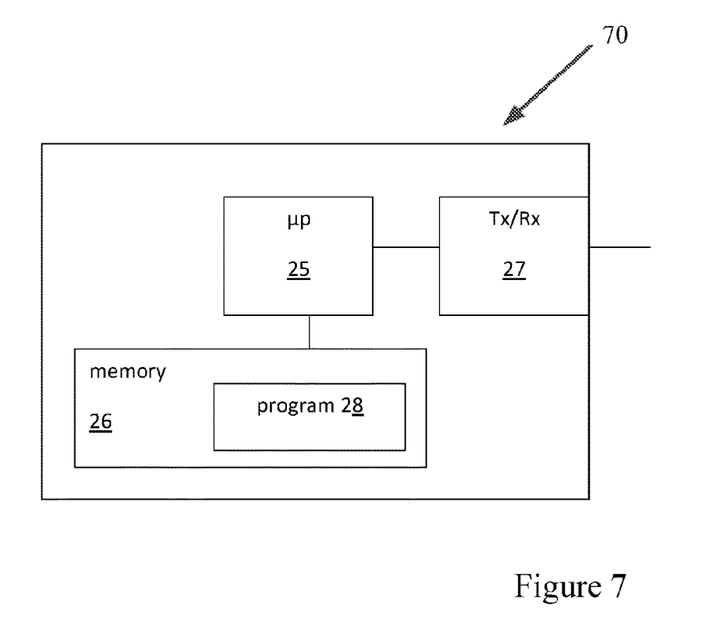
FIG. 7 illustrates schematically an exemplary user entity (UE)/terminal/bootstrapping client.

FIG. 7 illustrates schematically a UE, a terminal or a bootstrapping client 70 according to exemplary embodiments, and it may be any type of client device. The UE/terminal/bootstrapping client 33, 70 (hereinafter denoted bootstrapping client) of a terminal is adapted to assure that a particular user 31 is present at local user authentication, enabling authentication of a GAA client 34 to a NAF 36, 60. The bootstrapping client comprises a receiver/transmitter 27, a processor 25, and a memory 26 storing a computer program 26 comprising computer program code. When this computer program is run in the processor, it causes the bootstrapping client to receive 3, 402 from the GAA client, via the receiver/transmitter 27, a request for a NAF specific credential, the request comprising a Nonce. It further causes the bootstrapping client to request 4, 404 user authentication information; and to receive 5, 406 user authentication information. In addition, when this computer program is run in the processor, it causes the bootstrapping client to derive 6, 410 the NAF specific credential based on the Nonce, when the received user authentication information is correct. When this computer program is run in the processor, it also causes the bootstrapping client to send 7, 412 to the GAA client, via the receiver/transmitter 27, a response comprising said NAF specific credential, so that the GAA client can calculate an authentication response using the NAF specific credential, when local user authentication is given, and send said authentication response to the NAF.

The computer program may be obtained from a remote source, such as a data carrier.

The bootstrapping client 33, 70 may be comprised within a UICC 32.

The bootstrapping client 33, 70 may be trusted by the NAF.

The bootstrapping client 33, 70 may belong to a trusted open platform comprising the GAA client.

The user authentication information within the bootstrapping client 33, 70 may comprise a personal identification number, PIN code, comprising: a password, a token, a one-time password received via short message service, SMS, or a parameter generated from a hard token.

The user authentication information within the bootstrapping client 33, 70 may comprise a screen swipe pattern defined by the user or a fingerprint.

The bootstrapping client 33, 70 may be located in an entity separate from the GAA client.

The present disclosure also discloses a bootstrapping client 33, 70 of a terminal adapted to assure that a particular user is present at local user authentication, enabling authentication of a GAA client 34 to a NAF. The bootstrapping client is adapted to receive from the GAA client, a request for a NAF specific credential, the request comprising a Nonce. The bootstrapping client is further adapted to request user authentication information and to receive user authentication information. The bootstrapping client is also adapted to derive the NAF specific credential based on the Nonce, when the received user authentication information is correct, and to send to the GAA client, a response comprising said NAF specific credential, so that the GAR client can calculate an authentication response using the NAF specific credential, when local user authentication is given, and send said authentication response to the NAF.

This disclosure also provides a bootstrapping client 33, 70 in a terminal adapted to assure that a particular user 31 is present at local user authentication, enabling authentication of a GAA client 34 to a NAF node 36, 60. The bootstrapping client comprises:

- a transmitter/receiver 27 being configured to receive 3, 402 from the GAA client a request for a NAF specific credential, the request comprising a Nonce; to request 4, 404 user authentication information; to receive 5, 406 user authentication information; and
- a processor 25 that is configured to derive 6, 410 the NAF specific credential based on the Nonce, when the transmitter/receiver 27 has received user authentication information that is correct, and to send 7, 412 to the GAA client a response comprising said NAF specific credential, so that the GAA client can calculate an authentication response using the NAF specific credential, when local user authentication is given, and send said authentication response to the NAF.

This disclosure also provides a computer program 28 that comprises computer readable code which when run on a processor performs receiving from a GAA client a request for a NAF specific credential, wherein the request comprises a Nonce. When the computer program is run in the processor it performs requesting user authentication information, and receiving user authentication information. When the computer program is run in the processor it also performs deriving the NAF specific credential based on the Nonce, when the received user authentication information is correct. In addition, when the computer program is run in the processor performs sending to the GAA client a response comprising said NAF specific credential, so that the GAA client can calculate an authentication response using the NAF specific credential, when local user authentication is given, and send said authentication response to the NAF.

The processor may a processor of the bootstrapping client 33.

This disclosure also provides a computer program product comprising a computer program readable medium and a computer program 28, as described in the paragraph above, wherein the computer program is stored on a computer readable medium.

Advantages with the embodiments of the invention involve enabling a confirmation that correct user is present and gives consent for using GBA keys or credentials for an application. Using a Nonce approach ensures that the NAF specific credentials are always fresh and not cached in the GAA client, and that NAF specific credentials are bound to the Ua application transaction and cannot be used outside of that context. The embodiments further provide practically two-factor authentication, and avoid the burden and complexity of synchronizing the user authentication credentials, e.g. username and password or PIN code, with the network. It may be introduced as an add-on to the existing GBA functionality. If some component does not support the Nonce_UI, then regular GBA specific credentials are derived. Further, the embodiments do not impact GBA bootstrapping mechanisms, and any GBA bootstrapping mechanisms including e.g. GBA-digest may be used. The embodiments may be used with basically any Ua protocol that could support sending a Nonce. Further, the embodiments may be used to enhance security when GBA is used e.g. in conjunction with Single Sign On solutions or frameworks, including but not restricted to GBA-OpenID interworking or GBA-Liberty Alliance Identity Management interworking.

It is to be understood that the choice of interacting units or modules, as well as the naming of the units are only for exemplary purpose, and may be configured in a plurality of alternative ways in order to be able to execute the disclosed process actions. Further, the units or modules may be regarded as logical entities and not with necessity as separate physical entities. It will be appreciated that the scope of the technology disclosed herein fully encompasses other embodiments which may become obvious to those skilled in the art, and that the scope of this disclosure is accordingly not to be limited.

A reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the technology disclosed herein, for it to be encompassed hereby.

In the preceding description, for purposes of explanation and not limitation, specific details are set forth such as particular architectures, interfaces, techniques, etc. in order to provide a thorough understanding of the disclosed technology. However, it will be apparent to those skilled in the art that the disclosed technology may be practiced in other embodiments and/or combinations of embodiments that depart from these specific details. That is, those skilled in the art will be able to devise various arrangements which, although not explicitly described or shown herein, embody the principles of the disclosed technology. In some instances, detailed descriptions of well-known devices, circuits, and methods are omitted so as not to obscure the description of the disclosed technology with unnecessary detail. All statements herein reciting principles, aspects, and embodiments of the disclosed technology, as well as specific examples thereof, are intended to encompass both structural and functional equivalents thereof. Additionally, it is intended that such equivalents include both currently known equivalents as well as equivalents developed in the future, e.g. any elements developed that perform the same function, regardless of structure.

Thus, for example, it will be appreciated by those skilled in the art that the figures herein can represent conceptual views of illustrative circuitry or other functional units embodying the principles of the technology, and/or various processes which may be substantially represented in computer readable medium and executed by a computer or processor, even though such computer or processor may not be explicitly shown in the figures.

The functions of the various elements including functional blocks may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and are thus machine-implemented.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible.

ABBREVIATIONS

AKA authentication and key agreement
B-TID bootstrapping transaction identifier
BSF bootstrapping server function
FQDN fully qualified domain name
GAA generic authentication architecture
GBA generic bootstrapping architecture
HSS home subscriber server
IMPI IP multimedia private identity
IP Internet protocol
ISIM IP multimedia services identity module
KDF key derivation function
ME mobile equipment
NAF network application function
SLF subscriber locator function
UE user entity
(U)SIM (universal) subscriber identity module
USS user security settings

The invention claimed is:

1. A method in a bootstrapping client of a terminal, for assuring that a particular user is present at local user authentication, enabling authentication of a generic authentication architecture (GAA) client to a network application function (NAF), the method comprising:
  receiving from the GAA client a request for a NAF-specific credential, the request comprising a Nonce requiring user involvement (Nonce_UI);
  requesting user authentication information;
  receiving user authentication information;
  deriving the NAF-specific credential based on the Nonce_UI, when the received user authentication information is correct; and
  sending to the GAA client a response comprising said NAF-specific credential, so that the GAA client can calculate an authentication response using the NAF-specific credential, when local user authentication is given, and send said authentication response to the NAF.

2. The method according to claim 1, wherein receiving user authentication information comprises receiving a personal identification number (PIN) code comprising any of: a password, a token, a one-time password received via short message service (SMS), or a parameter generated from a hard token.

3. The method according to claim 1, wherein receiving user authentication information comprises receiving a screen swipe pattern defined by the user or a fingerprint.

4. A bootstrapping client of a terminal adapted to assure that a particular user is present at local user authentication, enabling authentication of a generic authentication architecture (GAA) client to a network application function (NAF), the bootstrapping client comprising:
  a transceiver comprising a receiver and a transmitter;
  a processor; and
  a memory storing a computer program comprising computer program code which when run in the processor, causes the bootstrapping client to:
    receive from the GAA client, via the transceiver, a request for a NAF-specific credential, the request comprising a Nonce requiring user involvement (Nonce_UI);
    request user authentication information;
    receive user authentication information;
    derive the NAF-specific credential based on the Nonce_UI, when the received user authentication information is correct, and to send to the GAA client, via the transceiver, a response comprising said NAF-specific credential, so that the GAA client can calculate an authentication response using the NAF-specific credential, when local user authentication is given, and send said authentication response to the NAF.

5. The bootstrapping client according to claim 4, wherein the bootstrapping client is comprised within a universal integrated circuit card (UICC).

6. The bootstrapping client according to claim 4, further being trusted by the NAF to only derive the NAF-specific credential based on the Nonce_UI when the received user authentication information is correct.

7. The bootstrapping client according to claim 4, belonging to a trusted open platform comprising the GAA client.

8. The bootstrapping client according to claim 4, wherein the user authentication information comprises a personal identification number (PIN) code, comprising: a password, a token, a one-time password received via short message service (SMS), or a parameter generated from a hard token.

9. The bootstrapping client according to claim 4, wherein the user authentication information comprises a screen swipe pattern defined by the user or a fingerprint.

10. The bootstrapping client according to claim 4, wherein the bootstrapping client and the GAA client are located in separated entities.

11. A method in a network application function (NAF) node, for authentication of a generic authentication architecture (GAA) client to the NAF, the method comprising:
  sending to the GAA client an authentication challenge comprising a Nonce requiring user involvement (Nonce_UI), such that the GAA client can send to a bootstrapping client a request for a NAF-specific credential, the request comprising the Nonce_UI;
  receiving from the GAA client a Ua application request comprising an authentication response to the authentication challenge, the authentication response being based on the NAF-specific credential as derived by the bootstrapping client based on the Nonce_UI, when the bootstrapping client is assured during a local user authentication that a particular user is present;

sending to a bootstrapping server function (BSF) a request for the NAF-specific credential, the request comprising said Nonce_UI;

receiving from the BSF the NAF-specific credential, which is calculated based on the Nonce_UI; and verifying the authentication response as received from the GAA client, based on the received NAF-specific credential.

12. The method according to claim 11, wherein receiving the NAF-specific credential, comprises receiving the NAF-specific credential calculated using a key derivation function.

13. The method according to claim 11, wherein receiving the NAF-specific credential comprises receiving the NAF-specific credential calculated based on user authentication information.

14. The method according to claim 13, wherein the user authentication information comprises a personal identification number (PIN) code, a screen swipe pattern or a fingerprint.

15. The method according to claim 14, wherein the PIN code comprises any of: a password, a token, a one-time password received via short message service (SMS), or a parameter generated from a hard token.

16. A network application function (NAF) node adapted to authenticate a GAA client to the NAF, the NAF comprising:

a receiver;

a transmitter;

a processor; and a memory storing a computer program comprising computer program code which when run in the processor, causes the NAF to:

send to the GAA client, via the transmitter an authentication challenge comprising a Nonce requiring user involvement (Nonce_UI), such that the GAA client can send to a bootstrapping client a request for a NAF-specific credential, the request comprising the Nonce_UI;

receive from the GAA client, via the receiver, a Ua application request comprising an authentication response to the authentication challenge, the authentication response being based on the NAF-specific credential as derived by the bootstrapping client based on the Nonce_UI, when the bootstrapping client is assured during a local user authentication that a particular user is present;

send to a bootstrapping server function (BSF) via the transmitter, a request for the NAF-specific credential, the request comprising said Nonce_UI;

receive from the BSF, via the receiver, the NAF-specific credential, which is calculated based on the Nonce_UI; and verify the authentication response as received from the GAA client, based on the received NAF-specific credential.

17. The NAF node according to claim 16, wherein the NAF-specific credential is calculated using the Nonce_UI, as generated by the BSF.

18. The NAF node according to claim 16, wherein the NAF-specific credential is calculated using a key derivation function.

19. The NAF node according to claim 16, wherein the NAF-specific credential is calculated based on user authentication information.

20. The NAF node according to claim 19, wherein the authentication information comprises a personal identification (PIN) code, a screen swipe pattern or a fingerprint.

21. The NAF node according to claim 20, wherein the PIN code comprises any of: a password, a token, a one-time password received via short message service (SMS), or a parameter generated from a hard token.

* * * * *